(12) United States Patent
Ma (10) Patent No.: US 11,091,053 B2
(45) Date of Patent: Aug. 17, 2021

(54) MOBILE CHARGING METHOD AND DEVICE

(71) Applicant: NIO (ANHUI) HOLDING CO., LTD., Hefei (CN)

(72) Inventor: Jun Ma, Hong Kong (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 759 days.

(21) Appl. No.: 15/751,673

(22) PCT Filed: Jul. 25, 2017

(86) PCT No.: PCT/CN2017/094208
§ 371 (c)(1),
(2) Date: Feb. 9, 2018

(87) PCT Pub. No.: WO2018/196187
PCT Pub. Date: Nov. 1, 2018

(65) Prior Publication Data
US 2020/0238846 A1 Jul. 30, 2020

(30) Foreign Application Priority Data
Apr. 28, 2017 (CN) .......................... 201710300001.1

(51) Int. Cl.
*H02J 7/00* (2006.01)
*B60L 53/36* (2019.01)
(Continued)

(52) U.S. Cl.
CPC ............. *B60L 53/36* (2019.02); *B60L 53/11* (2019.02); *B60L 53/12* (2019.02); *B60L 53/20* (2019.02);
(Continued)

(58) Field of Classification Search
CPC .................................................... B60L 53/36
(Continued)

(56) References Cited

U.S. PATENT DOCUMENTS 7,484,689 B2 * 2/2009 Musial ..................... B64F 1/34
244/1 R
7,511,451 B2 * 3/2009 Pierce .................. H01M 10/46
320/103
(Continued)

FOREIGN PATENT DOCUMENTS

| CN | 204012784 | 12/2014 |
|---|---|---|
| CN | 204597519 | 8/2015 |

(Continued)

OTHER PUBLICATIONS

International Search Report and Written Opinion prepared by the State Intellectual Property Office of the P.R.C. dated Dec. 15, 2017 for International Application No. PCT/CN2017/094208.
(Continued)

*Primary Examiner* — Samuel Berhanu
(74) *Attorney, Agent, or Firm* — Sheridan Ross P.C.

(57) ABSTRACT

The invention relates to the technology of new energy automobile, and in particular to an aircraft carrier type mobile charging vehicle, a cloud control and dispatch platform for controlling and dispatching a charging operation of the aircraft carrier type mobile charging vehicle, and a method for realizing mobile charging by using the aircraft carrier type mobile charging vehicle. The aircraft carrier type mobile charging vehicle according to an aspect of the invention comprises a main vehicle which comprises a main control unit, and at least one sub-vehicle which is adapted to be loaded onto the main vehicle in a detachable manner, the sub-vehicle comprising battery units adapted to charging an electric automobile, wherein the sub-vehicle is configured to execute the following operation: in response to a charging
(Continued)

service message sent from at least one of the main control unit, the electric automobile to be charged, and a cloud control and dispatch platform, the sub-vehicle moves to a position indicated by the charging service message, and uses the battery units to charge the electric automobile.

19 Claims, 4 Drawing Sheets

(51) Int. Cl.
    *B60L 53/12* (2019.01)
    *B60L 53/20* (2019.01)
    *B60L 53/53* (2019.01)
    *B60L 53/62* (2019.01)
    *B60L 53/10* (2019.01)
    *B60L 58/12* (2019.01)
    *B60L 53/30* (2019.01)
    *B60L 53/37* (2019.01)

(52) U.S. Cl.
    CPC ............. *B60L 53/305* (2019.02); *B60L 53/37* (2019.02); *B60L 53/53* (2019.02); *B60L 53/62* (2019.02); *B60L 58/12* (2019.02); *B60L 2210/10* (2013.01)

(58) Field of Classification Search
    USPC ........................................................ 320/109
    See application file for complete search history.

(56) References Cited

U.S. PATENT DOCUMENTS

| | | | | |
|---|---|---|---|---|
| 8,840,405 | B2* | 9/2014 | Thomas | B64F 1/227 |
| | | | | 439/35 |
| 9,592,742 | B1* | 3/2017 | Sosinov | B60L 53/68 |
| 2008/0266758 | A1* | 10/2008 | Hurt | H02S 30/20 |
| | | | | 361/625 |
| 2010/0233552 | A1* | 9/2010 | Knepple | B64D 41/00 |
| | | | | 429/420 |
| 2011/0025267 | A1* | 2/2011 | Kamen | B60L 53/665 |
| | | | | 320/109 |
| 2011/0101794 | A1* | 5/2011 | Schroeder | H01M 2/204 |
| | | | | 307/150 |
| 2012/0158227 | A1* | 6/2012 | Tate, Jr. | B60L 50/62 |
| | | | | 701/22 |
| 2015/0077061 | A1* | 3/2015 | Nomura | H02J 7/0003 |
| | | | | 320/126 |
| 2015/0175022 | A1* | 6/2015 | Storm | B60L 53/67 |
| | | | | 320/109 |
| 2019/0351773 | A1* | 11/2019 | Merritt | B60L 53/30 |

FOREIGN PATENT DOCUMENTS

| | | |
|---|---|---|
| CN | 105790357 | 7/2016 |
| CN | 205453231 | 8/2016 |
| CN | 106476770 | 3/2017 |
| JP | 2013-013208 | 1/2013 |

OTHER PUBLICATIONS

Official Action for China Patent Application 201710300001.1, dated Jul. 3, 2019, 13 pages.

* cited by examiner

MOBILE CHARGING METHOD AND DEVICE

CROSS REFERENCE TO RELATED APPLICATIONS

This application is a national stage application under 35 U.S.C. 371 and claims the benefit of PCT Application No. PCT/CN2017/094208 having an international filing date of 25 Jul. 2017, which designated the United States, which PCT application claimed the benefit of China Patent Application No. 201710300001.1 filed 28 Apr. 2017, the disclosure of each of which are incorporated herein by reference.

FIELD OF THE INVENTION

The invention relates to the technology of new energy automobile, and in particular to an aircraft carrier type mobile charging vehicle, a cloud control and dispatch platform for controlling and dispatching a charging operation of the aircraft carrier type mobile charging vehicle, and a method for realizing mobile charging by using the aircraft carrier type mobile charging vehicle.

BACKGROUND

In order to greatly reduce the emission of carbon dioxide of automobiles, tremendous manpower and material resources are being put into research in the automobile industry with the purpose of developing new types of automobiles which uses electrical power as power source, e.g., an electric automobile. Due to its less influence on the environment as compared with conventional automobiles, the prospect of new energy automobiles is being well recognized commonly. However, the promotion and spread of the market of pure electric automobiles are still facing many difficulties. For example, energy supplement of the battery is a prominent problem. Specifically, in the new types of automobiles, the battery is used to store electrical energy. In view of the security, cost and service life, the battery of electric automobile that is currently being developed has an energy density that is not high, thus limiting the endurance mileage after each time of charging. Therefore, providing a charging resource that has a high coverage density is an important aspect which enables the new energy automobile to be accepted by the market.

The emergence of mobile charging vehicle can well alleviate or even solve the problems mentioned above. However, in places such as a parking lot, vehicles are typically parked vary densely, thus resulting in a fact that there is no enough space nearby the vehicle to be charged to accommodate the mobile charging vehicle, and accordingly greatly limiting the overall efficiency of the charging service and further affecting user experience.

SUMMARY OF THE INVENTION

An object of the invention is to provide an aircraft carrier type mobile charging vehicle which facilitates improving the efficiency of charging service of the mobile charging vehicle.

The aircraft carrier type mobile charging vehicle according to an aspect of the invention comprises:
 a main vehicle which comprises a main control unit; and
 at least one sub-vehicle which is adapted to be loaded onto the main vehicle in a detachable manner, the sub-vehicle comprising battery units adapted to charging an electric automobile, wherein the sub-vehicle is configured to execute the following operation: in response to a charging service message sent from at least one of the main control unit, the electric automobile to be charged, and a cloud control and dispatch platform, the sub-vehicle moves to a position indicated by the charging service message, and uses the battery units to charge the electric automobile.

Preferably, in the above described aircraft carrier type mobile charging vehicle, the sub-vehicle is further configured to execute the following operation: in response to an electrical energy supplement message sent from at least one of the main control unit and the cloud control and dispatch platform, the sub-vehicle moves to a position indicated by the electrical energy supplement message, and uses an external power supply to charge the battery units.

Preferably, in the above described aircraft carrier type mobile charging vehicle, the main vehicle further comprises:
 an input interface adapted to be connected with an external power supply;
 a plurality of output interfaces adapted to be connected with the battery units of the sub-vehicle;
 a shunt switch connected between the input interface and the output interfaces,
 wherein under the control of the main control unit, the shunt switch selectively connects the input interface with one or more of the output interfaces so that the external power supply can charge the battery units of the sub-vehicle.

Preferably, in the above described aircraft carrier type mobile charging vehicle, the main vehicle further comprises an energy-carrying battery unit connected to the output interfaces via the shunt switch; under the control of the main control unit, the shunt switch selectively connects the energy-carrying battery unit of the main vehicle with one or more of the output interfaces so as to charge the battery units of the sub-vehicle.

Preferably, in the above described aircraft carrier type mobile charging vehicle, the main vehicle further comprises a power battery unit connected to the output interfaces via the shunt switch; under the control of the main control unit, the shunt switch selectively connects the power battery unit of the main vehicle with one or more of the output interfaces so as to charge the battery units of the sub-vehicle.

Preferably, in the above described aircraft carrier type mobile charging vehicle, the main control unit sets a charging sequence of the sub-vehicle by means of the shunt switch, according to the SOCs (state of charge) of the battery units of the sub-vehicle.

Preferably, in the above described aircraft carrier type mobile charging vehicle, the battery units of the sub-vehicle comprises:
 an energy storage battery;
 a DC/DC converter connected with the energy storage battery, which is configured to perform DC-DC conversion of the electrical energy output from the energy storage battery so as to match with the battery characteristic of the electric automobile; and
 an output control module which is configured to control charging of the electric automobile.

Preferably, in the above described aircraft carrier type mobile charging vehicle, the battery units of the sub-vehicle further comprise:
 a first input interface which is adapted to be connected with the output interfaces of the main vehicle so as to realize charging of the energy storage battery by the external power supply via the main vehicle; and a second input interface which is adapted to be connected with the external power supply so as to realize direct charging of the energy storage battery by the external power supply.

Preferably, in the above described aircraft carrier type mobile charging vehicle, the output control module is at least one of the following devices: a high power DC charging gun; an intermediate/low power DC charging gun and a wireless charging module.

Preferably, in the above described aircraft carrier type mobile charging vehicle, the sub-vehicle further comprises:

a communication module which is configured to communicate with the main control unit and the cloud control and dispatch platform; and a drive module which is configured to move the sub-vehicle.

Preferably, in the above described aircraft carrier type mobile charging vehicle, the sub-vehicle further comprises:

an image acquisition module, which is configured to acquire surrounding images of the sub-vehicle and upload the images to the main control unit or the cloud control and dispatch platform via the communication module; and a positioning module, which is configured to acquire a real-time position of the sub-vehicle and upload the position to the main control unit or the cloud control and dispatch platform via the communication module.

Preferably, in the above described aircraft carrier type mobile charging vehicle, the battery units of the sub-vehicle are further adapted to provide energy required for moving the sub-vehicle.

Another object of the invention is to provide a cloud control and dispatch platform which facilitates improving the efficiency of charging service of the mobile charging vehicle.

The cloud control and dispatch platform according to another aspect of the invention is used for controlling and dispatching a charging operation of the aircraft carrier type mobile charging vehicle, wherein the aircraft carrier type mobile charging vehicle comprises a main vehicle and at least one sub-vehicle, the main vehicle comprises a main control unit, and the sub-vehicle is adapted to be loaded onto the main vehicle in a detachable manner and comprises battery units adapted to charging an electric automobile; the cloud control and dispatch platform comprises a memory, a processor and a computer program that is stored in the memory and is capable of running on the processor, wherein the program is executed so as to realize the following steps:

instructing the main vehicle to carry the sub-vehicle to an area-to-be-served, in response to a charging service request; and sending the charging service request to the sub-vehicle, the charging service request indicating a position of an electric automobile to be served by the sub-vehicle.

Preferably, in the above described cloud control and dispatch platform, the program is executed so as to realize the following steps:

sending an electrical energy supplement message to the sub-vehicle in response to an event that the SOC of the battery unit of the sub-vehicle is lower than a preset threshold, the electrical energy supplement message indicating a position of an external power supply that can charge the battery unit of the sub-vehicle.

Further another object of the invention is to provide a method for realizing mobile charging, which facilitates improving the efficiency of charging service of the mobile charging vehicle.

The method for realizing mobile charging according to further another aspect of the invention comprises the following steps:

providing an aircraft carrier type mobile charging vehicle in an area-to-be-served, the aircraft carrier type mobile charging vehicle comprising a main vehicle and at least one sub-vehicle, the main vehicle comprising a main control unit, and the sub-vehicle being adapted to be loaded onto the main vehicle in a detachable manner and comprising battery units adapted to charging an electric automobile;

in response to a charging service message sent from at least one of the main control unit, the electric automobile to be charged, and a cloud control and dispatch platform, the sub-vehicle moving to a position indicated by the charging service message; and using the battery units to charge the electric automobile.

Preferably, in the above described method, the following steps are further included:

the main vehicle determining whether the SOC of a power battery unit or an energy-carrying battery unit included in the main vehicle is lower than a set threshold; and the main vehicle returning to a charge station if the SOC of the power battery unit or the energy-carrying battery unit included in the main vehicle is lower than the set threshold.

Preferably, in the above described method, the following steps are further included:

the main vehicle determining whether it is in an idle-load state; and the main vehicle returning to a charge station to load a new sub-vehicle, if the main vehicle is in the idle-load state.

Preferably, in the above described method, the following steps are further included:

in response to an electrical energy supplement message sent from at least one of the main control unit and the cloud control and dispatch platform, the sub-vehicle moving to a position indicated by the electrical energy supplement message; and using an external power supply to charge the battery units.

The invention has the following advantages:

1. it has solved the problem that it is difficult to perform charging for mobile charging vehicles in crowded places and the problem of low efficiency;

2. it has improved the overall efficiency of service in an area to be charged;

3. it has improved the utilization rate of idle charging resources; and 4. various charging resources and requirements can be best matched by means of the cloud control and dispatch platform so that the utilization rate of charging resources is maximized.

BRIEF DESCRIPTION OF THE DRAWINGS

The above and/or other aspects and advantages of the invention will become clearer and will be more easily understood from the following description of various aspects in connection with the accompanying drawings. Identical or similar units in the drawings are denoted by identical reference signs, wherein.

DETAILED DESCRIPTION OF THE INVENTION

The invention will be described more fully below with reference to the accompanying drawings which illustrate the exemplary embodiments of the invention. However, the invention can be carried out in different ways, and should not be construed as being merely limited to the various embodiments provided herein. The above embodiments provided herein are intended to make the disclosure of the application full and complete, and to convey the scope of protection of the invention more fully to those skilled in the art.

In the specification, terms such as "contain" and "comprise" or the like are intended to mean that in addition to the elements and steps directly and explicitly recited in the specification and claims, it is not excluded that the technical solutions of the invention may also have other elements and steps that are not directly and explicitly recited.

Terms such as "first" and "second" are not used to represent an order in terms of time, space, magnitude or the like, and are merely used for distinguishing between various units.

Figure 1:
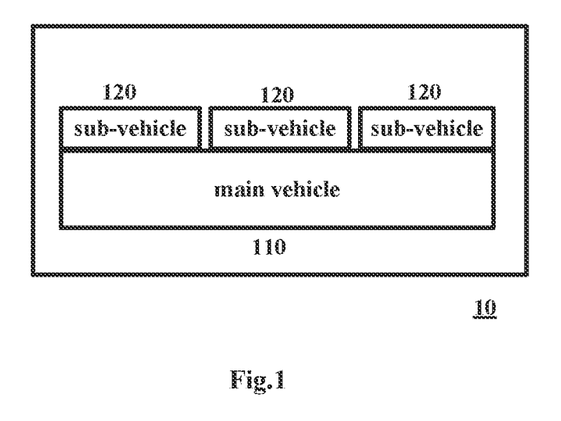
FIG. 1 is a schematic block diagram of an aircraft carrier type mobile charging vehicle according to an embodiment of the invention.

FIG. 1 is a schematic block diagram of an aircraft carrier type mobile charging vehicle according to an embodiment of the invention.

The aircraft carrier type mobile charging vehicle 10 shown in FIG. 1 comprises a main vehicle 110 and at least one sub-vehicle 120. Preferably, the main vehicle 110 has a long travel distance so as to ensure that in a case that the sub-vehicle(s) is carried, the main vehicle 110 can travel between a charge station and an area-to-be-served, such as a parking lot or the like. The main vehicle 110 may be for example a new energy automobile, or also be a common fuel automobile. The sub-vehicle 120 is detachably loaded onto the main vehicle 110 and comprises battery units. The sub-vehicle 120 has mobility which enables the sub-vehicle 120 to arrive at an electric automobile to be charged, when the sub-vehicle 120 is in the area-to-be-served. In the present embodiment, preferably, the outer shape and structure of the sub-vehicle 120 should be designed such that it can travel and can be parked in a narrow space (such as a space between vehicles, a space underneath a vehicle, a space between a vehicle and a stationary building, or the like).

It is noted that the electric automobile described in the specification comprises a pure electric automobile and a plug-in hybrid automobile.

Figure 2:
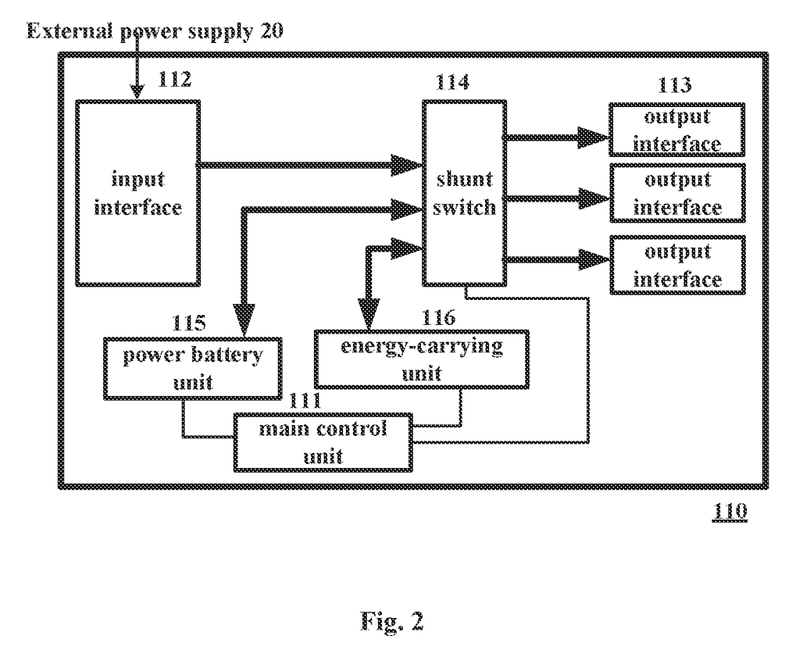
FIG. 2 is a schematic block diagram of a main vehicle in the aircraft carrier type mobile charging vehicle shown in FIG. 1.

FIG. 2 is a schematic block diagram of the main vehicle in the aircraft carrier type mobile charging vehicle shown in FIG. 1.

The main vehicle 110 shown in FIG. 2 comprises a main control unit 111, an input interface 112 adapted to be connected with an external power supply 20, one or more output interfaces 113 adapted to be connected with the battery units of the sub-vehicle, a shunt switch 114, and a power battery unit 115. Optionally, the main vehicle further comprises an energy-carrying battery unit 116 that can charge the battery units of the sub-vehicle.

As shown in FIG. 2, the shunt switch 114 is connected between the input interface 112 and the output interfaces 113, and is configured to, under the control of the main control unit 111, selectively connect the input interface 112 with one or more of the output interfaces 113 so that the external power supply can charge the battery units of the sub-vehicle. The shunt switch 114 is also connected between the energy-carrying battery unit 116 and the output interfaces 113, and is configured to, under the control of the main control unit, selectively connect the energy-carrying battery unit 116 of the main vehicle with one or more of the output interfaces 113 so as to charge the battery units of the sub-vehicle using the energy-carrying battery unit 116. Optionally, the shunt switch 114 is connected between the power battery unit 115 and the output interfaces 113, and is configured to, under the control of the main control unit, selectively connect the power battery unit 115 of the main vehicle with one or more of the output interfaces 113 so as to charge the battery units of the sub-vehicle using the energy-carrying battery unit 116.

The main control unit 111 is coupled with the shunt switch 114, the power battery unit 115 and the energy-carrying battery unit 116.

The main control unit 111 is configured to execute the following operation: sending a charging service message to the sub-vehicle, wherein charging service message indicates the position of the electric vehicle that is served by the sub-vehicle. Optionally, the charging service message can be navigation message for guiding the sub-vehicle to a designated position.

The main control unit 111 is also configured to execute the following operation: for example, according to the SOCs of the battery units of the sub-vehicle or a charging order set by the user, instructing the shunt switch 114 to selectively connect the input interface 112 with one or more of the output interfaces 113, or to selectively connect the energy-carrying battery unit 116 of the main vehicle with one or more of the output interfaces 113, or to selectively connect the power battery unit 115 of the main vehicle with one or more of the output interfaces 113.

The main control unit 111 is also configured to execute the following operation: selectively connecting the energy-carrying battery unit 116 of the main vehicle with the input interface 112 so as to charge the energy-carrying battery unit 116, or selectively connecting the power battery unit 115 of the main vehicle with the input interface 112 so as to charge the power battery unit 115.

The main control unit 111 is also configured to execute the following operation: determining whether the SOC of the power battery unit 115 or the energy-carrying battery unit 116 is lower than a set threshold, and instructing the main vehicle to return to the charge station for charge, if the SOC of the power battery unit 115 or the energy-carrying battery unit 116 is lower than the set threshold.

The main control unit 111 is also configured to execute the following operation: determining whether the main vehicle 110 is in an idle-load state (e.g., all or most of the sub-vehicles carried by the main vehicle has left the main vehicle), and instructing the main vehicle to return to the charge station for loading a new sub-vehicle, if the main vehicle 110 is in an idle-load state.

The main control unit 111 is also configured to execute the following operation: determining whether the SOC of the sub-vehicle is lower than a set threshold, designating an external power supply for the sub-vehicle and instructing sub-vehicle to move to the designated external power supply, if the SOC of the sub-vehicle is lower than the set threshold.

Figure 3:
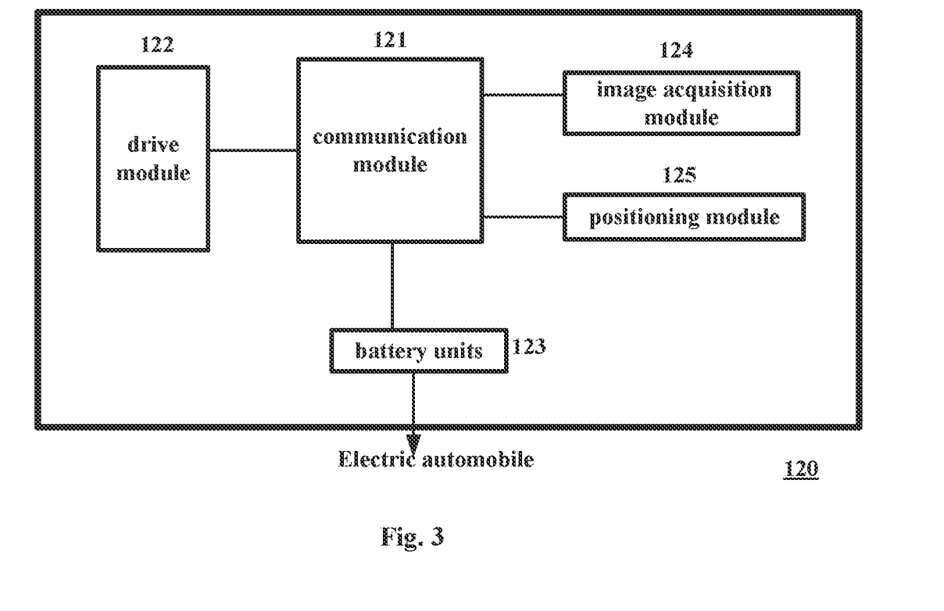
FIG. 3 is a schematic block diagram of a sub-vehicle in the aircraft carrier type mobile charging vehicle shown in FIG. 1.

FIG. 3 is a schematic block diagram of a sub-vehicle in the aircraft carrier type mobile charging vehicle shown in FIG. 1.

The sub-vehicle 120 shown in FIG. 3 comprises a communication module 121, a drive module 122 coupled with the communication module 121, and battery units 123 coupled with the communication module 121. Optionally, the sub-vehicle 120 further comprises an image acquisition module 124 (e.g., a camera) coupled with the communication module 121, and a positioning module 125 (GPS positioning device) coupled with the communication module 121.

The communication module 121 is configured to communicate with the main control unit of the main vehicle and the cloud control and dispatch platform. The drive module 122 is configured to drive the sub-vehicle to move, and the battery units 123 are configured to charge the electric automobile. Preferably, the battery units 123 are further configured to provide energy required for moving the sub-vehicle.

In an operation of providing charging service, the communication module 121 receives a charging service message from at least one of the main control unit, the electric automobile to be charged, and the cloud control and dispatch platform. The drive module 122 moves the sub-vehicle to a position indicated by the charging service message, and the battery units 123 charge the electric automobile. In an operation of supplementing electrical energy, the communication module 121 receives an electrical energy supplement message from at least one of the main control unit of the main vehicle and the cloud control and dispatch platform. The drive module 122 moves the sub-vehicle to a position indicated by the electrical energy supplement message, and an external power supply charges the battery units 123.

In the present embodiment, the image acquisition module 124 is configured to acquire surrounding images of the sub-vehicle and upload the images to the main control unit or the cloud control and dispatch platform via the communication module 121. The positioning module 125 is configured to acquire a real-time position of the sub-vehicle and upload the position to the main control unit or the cloud control and dispatch platform via the communication module 121.

Figure 4:
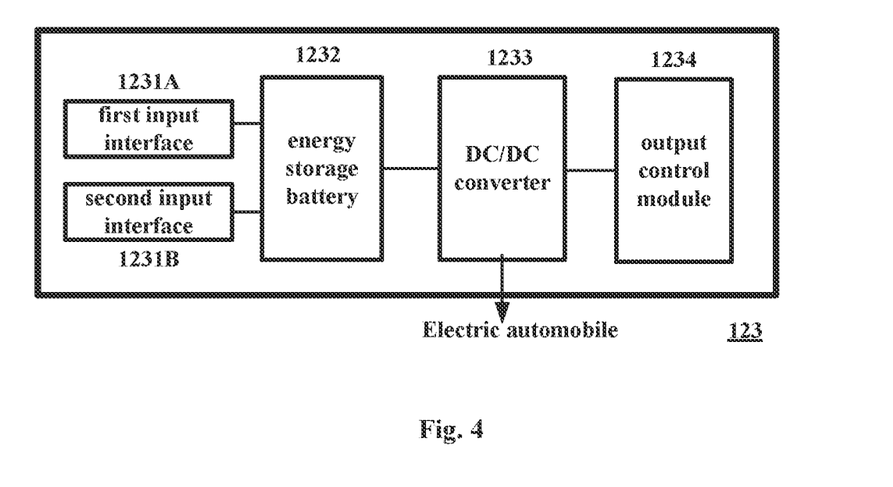
FIG. 4 is a schematic block diagram of battery units in the sub-vehicle shown in FIG. 3.

FIG. 4 is a schematic block diagram of battery units in the sub-vehicle shown in FIG. 3.

The battery units 123 as shown in FIG. 4 comprise a first input interface 1231A, a second input interface 1231B, an energy storage battery 1232, a DC/DC converter 1233 connected with the energy storage battery, and an output control module 1234. The first input interface 1231A is adapted to be connected with the output interfaces 113 of the main vehicle so as to charge the energy storage battery 1232 by the external power supply via the main vehicle. The second input interface 1231B is adapted to be connected with the external power supply so that the external power supply can directly charge the energy storage battery 1232. The DC/DC converter 1233 is configured to perform DC-DC conversion of the electrical energy output from the energy storage battery 1232 so as to match with the battery characteristic of the electric automobile. The output control module 1234 is configured to control charging of the electric automobile, and can be for example at least one of the following devices: a high power DC charging gun; an intermediate/low power DC charging gun and a wireless charging module.

Figure 5:
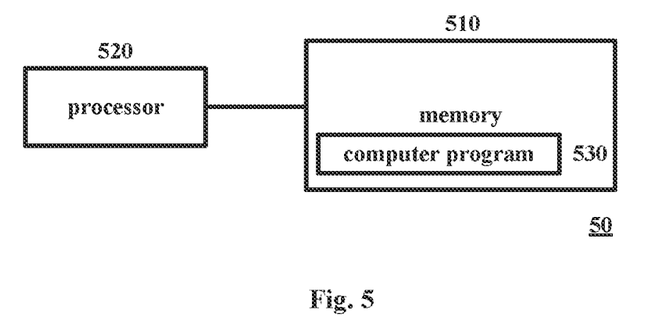
FIG. 5 is a schematic block diagram of a cloud control and dispatch platform for controlling and dispatching a charging operation of the aircraft carrier type mobile charging vehicle according to another embodiment of the invention.

FIG. 5 is a schematic block diagram of a cloud control and dispatch platform for controlling and dispatching a charging operation of the aircraft carrier type mobile charging vehicle according to another embodiment of the invention.

The cloud control and dispatch platform 50 as shown in FIG. 5 comprises a memory 510, a processor 520 and a computer program 530 that is stored in the memory 510 and is capable of running on the processor 520, wherein the computer program 530 is executed so as to realize a dispatch control of the charging operation of the aircraft carrier type mobile charging vehicle described above in connection with FIGS. 1 to 4.

By executing the computer program 530, the following steps can be realized: instructing the main vehicle 110 to carry the sub-vehicle 120 to an area-to-be-served, in response to a charging service request; and sending a charging service message to the sub-vehicle 120, the charging service message indicating a position of an electric automobile to be served by the sub-vehicle. Optionally, the charging service message can be navigation message for guiding the sub-vehicle to a designated position.

By executing the computer program 530, the following steps can also be realized: determining whether the SOC of the sub-vehicle is lower than a preset threshold, and designating an external power supply for the sub-vehicle and instructing the sub-vehicle to move to the designated external power supply, if the SOC of the sub-vehicle is lower than a preset threshold.

Figure 6:
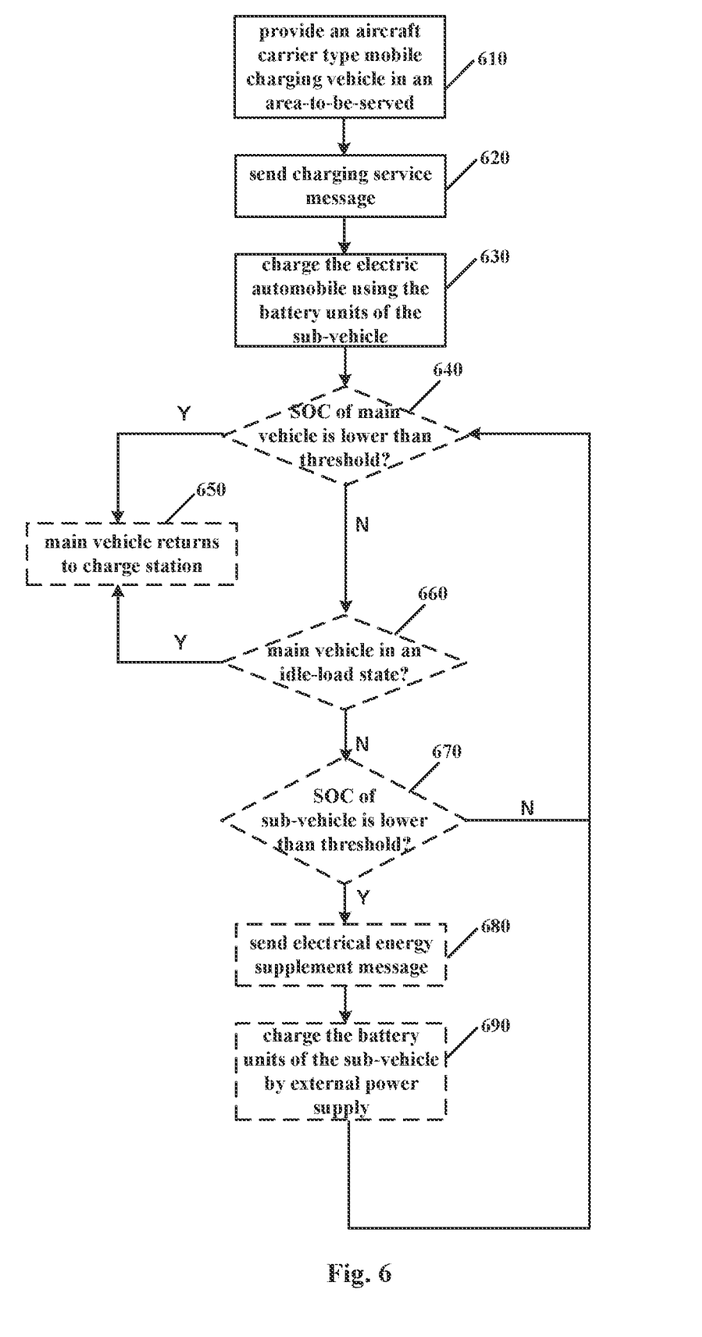
FIG. 6 is a flowchart of a method for realizing mobile charging by using the aircraft carrier type mobile charging vehicle according to further another embodiment of the invention.

FIG. 6 is a flowchart of a method for realizing mobile charging by using the aircraft carrier type mobile charging vehicle according to further another embodiment of the invention.

As shown in FIG. 6, in step 610, an aircraft carrier type mobile charging vehicle is provided in an area-to-be-served, wherein the aircraft carrier type mobile charging vehicle may have various features of the aircraft carrier type mobile charging vehicle as shown in FIGS. 1 to 4.

Then, step 620 is executed, in which in response to a charging service message sent from at least one of the main control unit, the electric automobile to be charged, and a cloud control and dispatch platform, the sub-vehicle of the aircraft carrier type mobile charging vehicle moves to a position indicated by the charging service message.

Next, in step 630, the sub-vehicle charges the electric automobile using the battery units thereof.

Optionally, the method shown in FIG. 6 further comprise the following steps after step 630 is executed.

In step 640, the main vehicle determines whether the SOC of a power battery unit or an energy-carrying battery unit included in the main vehicle is lower than a set threshold; and step 650 is executed if the SOC of the power battery unit or the energy-carrying battery unit included in the main vehicle is lower than the set threshold; otherwise, step 660 is executed.

In step 650, a command is generated which commands the main vehicle to return to the charge station so as to supplement electrical energy of the main vehicle.

In step 660, the main vehicle determines whether it is in an idle-load state; if yes, step 650 is executed so as to load a new vehicle; otherwise, step 670 is executed.

In step 670, at least one of the main control unit and the cloud control and dispatch platform determines whether the SOC of the battery unit of the sub-vehicle is lower than a set threshold; if yes, step 680 is executed; otherwise, the process returns to step 640.

In step 680, at least one of the main control unit and the cloud control and dispatch platform sends an electrical energy supplement message to the sub-vehicle.

Then, step 690 is executed, in which the sub-vehicle moves to the position indicated by the electrical energy supplement message, and the battery units of the sub-vehicle are charged by an external power supply. After step 690 is executed, the method shown in FIG. 6 returns to step 640.

The embodiments and examples are provided herein so as to better illustrate embodiments of the present technology and specific applications thereof so that those skilled in the art can carry out and use the invention. However, it will be appreciated by those skilled in the art that the above description and examples are provided merely for illustration and exemplification. The description provided herein is not intended to cover various aspects of the invention, or to limit the invention to the precise forms disclosed herein.

In view of the above description, the scope of the disclosure is determined by the following claims only.

What is claimed is:

1. A mobile charging vehicle, characterized by comprising:
   a main vehicle which comprises a main control unit; and
   at least one electric vehicle which is adapted to be loaded onto the main vehicle in a detachable manner, the electric vehicle comprising battery units adapted to charging an electric automobile,
   wherein the electric vehicle is configured to execute the following operation: in response to a charging service message sent from at least one of the main control unit, the electric automobile to be charged, and a cloud control and dispatch platform, the electric vehicle moves to a position indicated by the charging service message, and uses the battery units to charge the electric automobile;
   wherein the main vehicle is configured to:
   determine whether it is in an idle-load state; and
   return to a charge station to load a new electric vehicle, if the main vehicle is in the idle-load state.

2. The mobile charging vehicle according to claim 1, wherein the electric vehicle is further configured to execute the following operation: in response to an electrical energy supplement message sent from at least one of the main control unit and the cloud control and dispatch platform, the electric vehicle moves to a position indicated by the electrical energy supplement message, and uses an external power supply to charge the battery units.

3. The mobile charging vehicle according to claim 1, wherein the main vehicle further comprises:
   an input interface adapted to be connected with an external power supply;
   a plurality of output interfaces adapted to be connected with the battery units of the electric vehicle;
   a shunt switch connected between the input interface and the output interfaces,
   wherein under the control of the main control unit, the shunt switch selectively connects the input interface with one or more of the output interfaces so that the external power supply can charge the battery units of the electric vehicle.

4. The mobile charging vehicle according to claim 3, wherein the main vehicle further comprises an energy-carrying battery unit connected to the output interfaces via the shunt switch; under the control of the main control unit, the shunt switch selectively connects the energy-carrying battery unit of the main vehicle with one or more of the output interfaces so as to charge the battery units of the electric vehicle.

5. The mobile charging vehicle according to claim 3, wherein the main vehicle further comprises a power battery unit connected to the output interfaces via the shunt switch; under the control of the main control unit, the shunt switch selectively connects the power battery unit of the main vehicle with one or more of the output interfaces so as to charge the battery units of the electric vehicle.

6. The mobile charging vehicle according to claim 3, wherein the main control unit sets a charging sequence of the electric vehicle by means of the shunt switch, according to the SOCs of the battery units of the electric vehicle.

7. The mobile charging vehicle according to claim 3, wherein the battery units of the electric vehicle comprises:
   an energy storage battery;
   a DC/DC converter connected with the energy storage battery, which is configured to perform DC-DC conversion of the electrical energy output from the energy storage battery so as to match with the battery characteristic of the electric automobile; and
   an output control module which is configured to control charging of the electric automobile.

8. The mobile charging vehicle according to claim 7, wherein the battery units of the electric vehicle further comprise:
   a first input interface which is adapted to be connected with the output interfaces of the main vehicle so as to realize charging of the energy storage battery by the external power supply via the main vehicle; and
   a second input interface which is adapted to be connected with the external power supply so as to realize direct charging of the energy storage battery by the external power supply.

9. The mobile charging vehicle according to claim 7, wherein the output control module is at least one of the following devices: a high power DC charging gun; an intermediate/low power DC charging gun and a wireless charging module.

10. The mobile charging vehicle according to claim 1, wherein the electric vehicle further comprises:
    a communication module which is configured to communicate with the main control unit and the cloud control and dispatch platform; and
    a drive module which is configured to move the electric vehicle.

11. The mobile charging vehicle according to claim 10, wherein the electric vehicle further comprises:
    an image acquisition module, which is configured to acquire surrounding images of the electric vehicle and upload the images to the main control unit or the cloud control and dispatch platform via the communication module; and
    a positioning module, which is configured to acquire a real-time position of the electric vehicle and upload the position to the main control unit or the cloud control and dispatch platform via the communication module.

12. The mobile charging vehicle according to claim 1, wherein the battery units of the electric vehicle are further adapted to provide energy required for moving the electric vehicle.

13. A cloud control and dispatch platform, which is used for controlling and dispatching a charging operation of the mobile charging vehicle, wherein the mobile charging vehicle comprises a main vehicle and at least one electric vehicle, the main vehicle comprises a main control unit, and the electric vehicle is adapted to be loaded onto the main vehicle in a detachable manner and comprises battery units adapted to charging an electric automobile; the cloud control and dispatch platform comprises a memory, a processor and a computer program that is stored in the memory and is capable of running on the processor, wherein the program is executed so as to realize the following steps:
- instructing the main vehicle to carry the electric vehicle to an area-to-be-served, in response to a charging service request; and
- sending the charging service request to the electric vehicle, the charging service request indicating a position of an electric automobile to be served by the electric vehicle,
- where the main vehicle is configured to:
- determine whether it is an idle-load state; and
- return to a charge station to load a new electric vehicle, if the main vehicle is in the idle-load state.

14. The cloud control and dispatch platform according to claim 13, wherein the program is executed so as to realize the following steps:
- sending an electrical energy supplement message to the electric vehicle in response to an event that the SOC of the battery unit of the electric vehicle is lower than a preset threshold, the electrical energy supplement message indicating a position of an external power supply that can charge the battery unit of the electric vehicle.

15. A method for realizing mobile charging, characterized by comprising the following steps:
- providing a mobile charging vehicle in an area-to-be-served, the mobile charging vehicle comprising a main vehicle and at least one electric vehicle, the main vehicle comprising a main control unit, and the electric vehicle being adapted to be loaded onto the main vehicle in a detachable manner and comprising battery units adapted to charging an electric automobile;
- in response to a charging service message sent from at least one of the main control unit, the electric automobile to be charged, and a cloud control and dispatch platform, the electric vehicle moving to a position indicated by the charging service message; and
- using the battery units to charge the electric automobile, wherein the method further including the following steps:
- the main vehicle determining whether it is in an idle load state; and
- the main vehicle returning to a charge station to load a new electric vehicle, if the main vehicle is in the idle-load state.

16. The method according to claim 15, further including the following steps:
- the main vehicle determining whether the SOC of a power battery unit or an energy-carrying battery unit included in the main vehicle is lower than a set threshold; and
- the main vehicle returning to a charge station if the SOC of the power battery unit or the energy-carrying battery unit included in the main vehicle is lower than the set threshold.

17. The method according to claim 15, further including the following steps:
- in response to an electrical energy supplement message sent from at least one of the main control unit and the cloud control and dispatch platform, the electric vehicle moving to a position indicated by the electrical energy supplement message; and
- using an external power supply to charge the battery units.

18. The mobile charging vehicle according to claim 4, wherein the main control unit sets a charging sequence of the sub-vehicle by means of the shunt switch, according to the SOCs of the battery units of the electric vehicle.

19. The mobile charging vehicle according to claim 5, wherein the main control unit sets a charging sequence of the sub-vehicle by means of the shunt switch, according to the SOCs of the battery units of the electric vehicle.

* * * * *

UNITED STATES PATENT AND TRADEMARK OFFICE
CERTIFICATE OF CORRECTION

PATENT NO. : 11,091,053 B2
APPLICATION NO. : 15/751673
DATED : August 17, 2021
INVENTOR(S) : Jun Ma Page 1 of 1

It is certified that error appears in the above-identified patent and that said Letters Patent is hereby corrected as shown below:

In the Claims

Claim 13, Column 11, Line 18: delete "where" and insert --wherein--

Claim 13, Column 11, Line 19: delete "whether it is an idle-load state" and insert --whether it is in an idle-load state--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*